United States Patent [19]
Couttet et al.

[11] 3,979,321
[45] Sept. 7, 1976

[54] MIXTURE OF LIQUID CRYSTALS EXHIBITING POSITIVE DIELECTRIC ANISOTROPY AND A WIDE MESOMORPHIC RANGE

[75] Inventors: André Couttet; Jean Claude Dubois; Annie Zann, all of Paris, France

[73] Assignee: Thomson-CSF, Paris, France

[22] Filed: June 11, 1975

[21] Appl. No.: 585,869

[30] Foreign Application Priority Data
June 14, 1974 France .............................. 74.20714

[52] U.S. Cl. .......................... 252/299; 350/160 LC
[51] Int. Cl.² ....................... C09K 3/34; G02F 1/13
[58] Field of Search .................... 252/299, 408 LC; 350/150, 160 LC

[56] References Cited
UNITED STATES PATENTS

| | | | |
|---|---|---|---|
| 3,872,140 | 3/1975 | Klanderman et al. .............. | 252/299 |
| 3,891,307 | 6/1975 | Tsukamoto et al. ........... | 350/160 LC |

FOREIGN PATENTS OR APPLICATIONS

| | | | |
|---|---|---|---|
| 807,165 | 3/1974 | Belgium .............................. | 252/299 |
| 2,321,632 | 11/1974 | Germany ............................ | 252/299 |
| 2,306,738 | 8/1973 | Germany ............................ | 252/299 |
| 49-130882 | 12/1974 | Japan ................................. | 252/299 |

OTHER PUBLICATIONS
Gray, G. W. et al., Electronics Letters, vol. 9, No. 6, pp. 130–131, (Mar. 1973).
Dave, J. S. et al., J. Chem. Soc. (A), pp. 1473–1478, (1967).

*Primary Examiner*—Benjamin R. Padgett
*Assistant Examiner*—T. S. Gron
*Attorney, Agent, or Firm*—Cushman, Darby & Cushman

[57] ABSTRACT stability, mixture of liquid crystals comprising a substance which imparts a medium positive dielectric anisotropy, and substances which widen the mesomorphic temperature range or impart good long-term stabilty, is provided. The mixture in accordance with the invention comprises at least one substance of the formula:

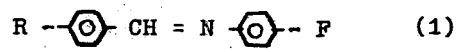

(1)

or its isomer of the formula:

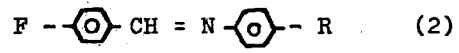

(2)

where R is an alkyl or alkoxy radical and at least one substance of the formula:

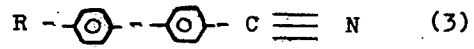

(3)

where the radical R is of the same kind as mentioned earlier or substance of the formula:

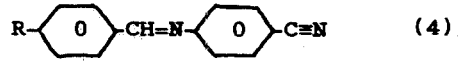

(4)

or its isomer of the formula:

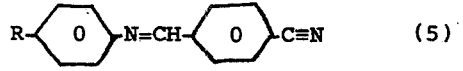

(5)

where R is an alkoxy radical.

6 Claims, No Drawings

MIXTURE OF LIQUID CRYSTALS EXHIBITING POSITIVE DIELECTRIC ANISOTROPY AND A WIDE MESOMORPHIC RANGE

The present invention relates to a mixture of liquid crystals exhibiting positive dielectric anisotropy and a wide mesomorphic range.

Those skilled in the art will recollect that the dielectric anisotropy of a liquid crystal is the difference between the dielectric constants measured parallel to the molecular axis (the molecules generally being of elongated form) and perpendicularly to this axis. A molecule possessing positive dielectric anisotropy tends to align itself parallel with an external electric field in which the molecule is located. This property is utilised in particular in so-called "twisted cell" display devices. In a structure of this kind, the axes of the molecules are initially distributed helically whilst remaining perpendicular to a common direction which is the viewing direction. This kind of distribution has the property of rotating polarised light. The application of an electric field parallel to the axis of the helix produces rotation of the assembly of molecules which align themselves parallel to the field and to the viewing direction, causing the rotating power to disappear.

The known liquid crystals which exhibit positive dielectric anisotropy are unsuitable for certain applications, in particular because their anisotropy is too weak or too strong, because they cannot always be used at normal temperature or within certain temperature ranges, and, finally, because their stability is sometimes inadequate.

The invention makes it possible to overcome the majority of these drawbacks.

According to the present invention, there is provided a mixture of liquid crystals, comprising at least one substance satisfying the formula:

(1) R –⟨O⟩– C H = N –⟨O⟩– F 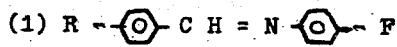

or the formula:

(2) F –⟨O⟩– C H = N –⟨O⟩– R 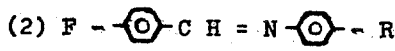

where R is a linear alkyl radical $C_nH_{2n+1}$ or a linear alkoxy-radical $C_nH_{2n+1}O$ in which n is a whole number less than or equal to 15.

These substances may be manufactured in the following way. The following basic materials form the starting point:

alkoxy 4- benzaldehyde and fluoro-4-aniline, or alkyl-4-benzaldehyde and fluoro-4-aniline, in the case of the formula (1);

alkoxy-4-aniline and fluoro-4-benzaldhyde, or alkyl-4-aniline and fluoro-4-benzaldehyde, in the case of the formula (2).

These materials are dissolved in benzene and the system is raised to 80° C, the benzene being maintained in reflux. The water which is formed is continuously removed during the reaction by a process of azeotropic distillation. The benzene is then eliminated by evaporation under vacuum, and the reaction substance is then dissolved in hot ethanol. Between four and five recrystallisations in the solvent are then sufficient to produce a p-alkoxy (or alkyl) -benzylidene-p-fluoro-aniline in the case of formula (1), and a p-fluoro-benzylidene-p'-alkyl (or alkoxy) aniline in the case of formula (2).

To increase the mesomorphic range of a liquid crystal, that is to say in order to increase the range of temperatures in which it exhibits its characteristic properties, various liquid crystals are mixed together, the mixture preferably being in the eutectic state. The composition and melting temperature of the eutectic structure are determined by calculation using the SCHRODER VAN LAAR equations, in particular the following one;

$$L(x_i)_E = \frac{\Delta H_{fi}}{R_{GP}} \left[ \frac{1}{T_E} - \frac{1}{T_{fi}} \right]$$

where

L designates the logarithm to the base e of the term following it;

$(x_i)_E$ designates the molar fraction of the compound i in the eutectic state;

$\Delta H_{fi}$ designates the latent heat of fusion of the pure compound i;

$R_{GP}$ designates the gas constant;

$T_E$ designates the fusion temperature of the eutectic structure;

$T_{fi}$ designates the fusion temperature of the pure compound i.

It should be pointed out that the sum of the molar fractions of the compounds should be equal to unity (or to 100 if $x_i$ is expressed in mole percent).

The eutectic mixtures are prepared in accordance with the theoretical composition and their mesomorphic range is verified by thermal analysis.

In the three examples which now follow, one or two substances of the formulae (1) or (2), are mixed with one (or several) alkoxy-4-aniline-nitriline-4'-benzylidene or alkoxy-4-benzylidene-nitrile-4'-aniline. The $x_i$ values are expressed in mole percent. The mesomorphic range is indicated by the extreme temperatures of the nematic range of the mixture.

| Constituents of the mixture | | | $x_i$ (mole %) | nematic range |
|---|---|---|---|---|
| First example: | | | | |
| $C_6H_{13}O$ | ⟨O⟩–CH=N | ⟨O⟩–F | 40 % | |
| $C_6H_{13}O$ | ⟨O⟩–CH=N | ⟨O⟩–C≡N | 42 % | 25°C to 80°C |
| $C_6H_{13}O$ | ⟨O⟩–N=CH | ⟨O⟩–C≡N | 18 % | |
| Second example: | | | | |
| $C_5H_{11}$ | ⟨O⟩–N=CH | ⟨O⟩–F | 40 % | |
| $C_6H_{13}O$ | ⟨O⟩–CH=N | ⟨O⟩–F | 29 % | 8°C to 43°C |
| $C_6H_{13}O$ | ⟨O⟩–CH=N | ⟨O⟩–C≡N | 31 % | |
| Third example: | | | | |
| $C_6H_{13}O$ | ⟨O⟩ CH=N ⟨O⟩ F | | 34 % | |
| $C_6H_{13}O$ | ⟨O⟩ CH=N ⟨O⟩ C≡N | | 36 % | 15°C to 80°C |
| $C_8H_{17}O$ | ⟨O⟩ CH=N ⟨O⟩ C≡N | | 15 % | |
| $C_8H_{17}O$ | ⟨O⟩ N=CH ⟨O⟩ C≡N | | 15 % | |

A substance of the formula (1) or (2) used in the mixture in accordance with the invention exhibits, when in the pure state, a mesomorphic range of greater or lesser extent, either nematic or smectic in type (type A or B), possibly with no mesomorphism.

The following table sets out the mesomorphism exhibited by some substances of the formula (1) or (2):

| Formula | Radical R | Mesomorphism observed |
|---|---|---|
| (1) | $C_4H_9O$ | smectic (A) from 59.4°C to 60.9°C (by supercooling) nematic from 60.9°C to 66.7°C (by supercooling) |
| (1) | $C_6H_{13}O$ | smectic (B) from 55.5°C to 57.3°C smectic (A) from 57.3°C to 62°C nematic from 62°C to 63.5°C |
| (1) | $C_8H_{17}O$ | smectic (A) from 62°C to 65.8°C |
| (2) | $C_6H_{13}O$ | none |
| (2) | $C_4H_9$ | none |
| (2) | $C_5H_{11}$ | nematic from 11°C to 41°C by supercooling |
| (2) | $C_6H_{13}$ | nematic from 10°C to 26°C, by supercooling |
| (2) | $C_7H_{15}$ | nematic from 8.5°C to 25°C by supercooling |

The stability of the liquid crystal can be improved by utilising in the mixture only one constituent of the formula (1) or (2), with other constituents having no —C H + N — bond, in particular a compound of the biphenyl kind having the formula:

where R is an alkyl or alkoxy radical of the same kind encountered in the formulae (1) and (2).

Thus, using substances of the formula (3), the following mixture has been produced:

| Constituents of the mixture | $x_i$ (mole %) | nematic range |
|---|---|---|
| Fourth example: | | |
| $C_7H_{15}$ ⟨O⟩ N=CH ⟨O⟩ F | 20 % | |
| $C_5H_{11}$ ⟨O⟩ — ⟨O⟩ C≡N | 42 % | |
| $C_3H_7O$ ⟨O⟩ — ⟨O⟩ C≡N | 12 % | 10°C to 48°C |
| $C_5H_{11}O$ ⟨O⟩ — ⟨O⟩ C≡N | 8 % | |
| $C_7H_{15}O$ ⟨O⟩ — ⟨O⟩ C≡N | 8 % | |
| $C_8H_{17}O$ ⟨O⟩ — ⟨O⟩ C≡N | 10 % | |

The mixture produced using benzoic acid esters also fall within the scope of the invention.

What we claim is:
1. A eutectic mixture of liquid crystals consisting essentially of at least one compound selected from the formulae:

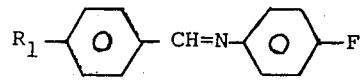

where $R_1$ is $C_4H_9O$, $C_6H_{13}O$ or $C_8H_{17}O$ or

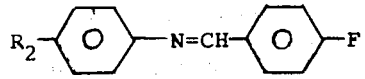

where $R_2$ is $C_5H_{11}$, $C_6H_{13}$ or $C_7H_{15}$, and mixtures thereof, mixed with at least one compound selected from the formulae:

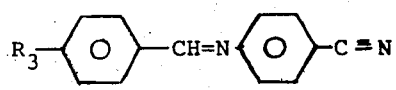

and

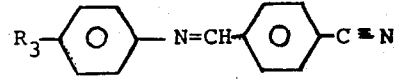

where $R_3$ is $C_6H_{13}O$ or $C_8H_{17}O$ and mixtures thereof.

2. A eutectic mixture of liquid crystals consisting essentially of at least one compound of the formula:

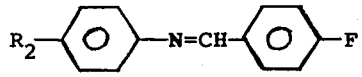

where $R_2$ is $C_5H_{11}$, $C_6H_{13}$ or $C_7H_{15}$ mixed with at least one compound of the formula:

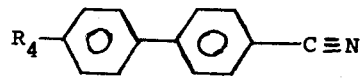

where $R_4$ is $C_5H_{11}$, $C_3H_7O$, $C_5H_{11}O$, $C_8H_{17}O$ or $C_7H_{15}O$.

3. A eutectic mixture of liquid crystals as claimed in claim 1, comprising the following substances in the proportions indicated:

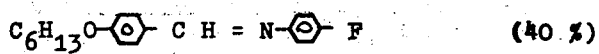 (40 %)

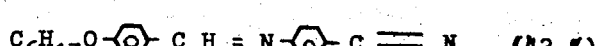 (42 %)

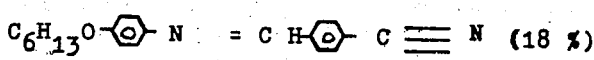 (18 %)

4. A eutectic mixture of liquid crystals as claimed in claim 1, comprising the following substances in the proportions indicated:

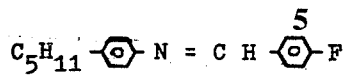 (40 %)
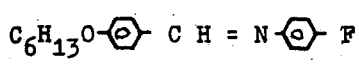 (29 %)
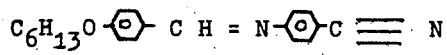 (31 %)
5. A eutectic mixture of liquid crystals as claimed in claim 1, comprising the following substances in the proportions indicated:
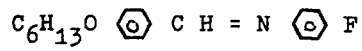 (34 %)
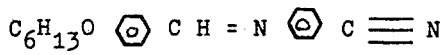 (36 %)
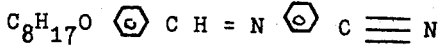 (15 %)
C$_8$H$_{17}$O ⟨○⟩ N = C H ⟨○⟩ C ≡ N (15 %)
6. A eutectic mixture of liquid crystals as claimed in claim 2, consisting essentially of the following substances in the proportions indicated:
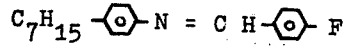 (20 %)
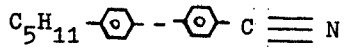 (42 %)
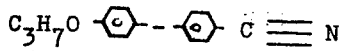 (12 %)
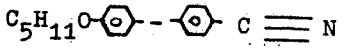 (8 %)
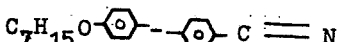 (8 %)
 (10 %)
* * * * *